United States Patent [19]

Spain et al.

[11] Patent Number: 5,112,545

[45] Date of Patent: May 12, 1992

[54] COMPOSITE PREFORMS AND ARTICLES AND METHODS FOR THEIR MANUFACTURE

[75] Inventors: Raymond G. Spain, Farmington Hills; Susan M. DeGrood, Wixom, both of Mich.

[73] Assignee: Airfoil Textron Inc., Lima, Ohio

[21] Appl. No.: 480,061

[22] Filed: Feb. 14, 1990

[51] Int. Cl.⁵ .................... B29D 28/00; B01D 28/00; D02G 1/20

[52] U.S. Cl. .................. 264/103; 428/225; 428/244; 428/288; 428/289; 428/408; 264/137; 264/257

[58] Field of Search ............ 264/122, 109, 56, 63, 264/257, 103, 137

[56] References Cited

U.S. PATENT DOCUMENTS

| | | | |
|---|---|---|---|
| 3,966,522 | 6/1976 | Hatch et al. | 156/148 |
| 4,396,663 | 8/1983 | Mitchell et al. | 428/111 |
| 4,467,838 | 8/1984 | Rheaume | 139/305 |
| 4,729,860 | 3/1988 | Leach | 264/103 |
| 4,741,873 | 5/1988 | Fischer et al. | 264/25 |

FOREIGN PATENT DOCUMENTS

89/08554  9/1989  PCT Int'l Appl. ............ 428/266

OTHER PUBLICATIONS

Information about Silicone Resins, Copyrighted 1985, Dow Corning Corporation.

*Primary Examiner*—Paul J. Thibodeau
*Assistant Examiner*—Richard C. Weisberger
*Attorney, Agent, or Firm*—Reising, Ethington, Barnard, Perry & Milton

[57] ABSTRACT

A multi-dimensional (e.g., 3D braided) preform formed of reinforcement strands or filaments is rigidized by impregnating the preform with a resin solution (e.g., silicone resin solution), curing the resin to impart a selected shape to the preform and then heating the shaped preform to convert the cured resin to inorganic solids (e.g., silica solids) so dispersed in an effective amount between the strands as to rigidize the preform. The rigidized preform is then infiltrated with an inorganic matrix (e.g., a ceramic material) to form a composite article.

8 Claims, 1 Drawing Sheet

COMPOSITE PREFORMS AND ARTICLES AND METHODS FOR THEIR MANUFACTURE

FIELD OF THE INVENTION

The present invention relates to filament reinforced composite articles and, in particular, to a method of initially rigidizing near final shape filamentary preforms, as well as the preforms thereby produced, such that the preforms can be handled, optionally machined and impregnated with a matrix without loss of shape integrity.

BACKGROUND OF THE INVENTION

Multi-dimensional (e.g., two dimensional and three dimensional) filamentary preforms have been infiltrated/impregnated with an organic or inorganic matrix material to form filament reinforced composite articles. The reinforcing filaments of the woven or braided preform may comprise a variety of materials including, but not limited to, glass, fused silica, ceramics, carbon, graphite, refractory metals as well as others.

In order to obtain accurately sized and shaped composite articles from woven or braided preforms, it is necessary to maintain a desired preform shape during subsequent handling and infiltration/impregnation of the preform with a matrix material. In some situations the preform may be subjected to some slight machining prior to matrix infiltration/impregnation. The as-woven or braided shape must be maintained during this operation as well.

The problem of shape integrity of the woven or braided filamentary preform is exacerbated when the preform must include thin sections (e.g., feather edges) that are easily distorted during subsequent handling, machining and matrix infiltration/impregnation.

There is thus a need to minimize the shape instability of the filamentary preform and to provide a near final shape preform that can accommodate subsequent handling, matrix infiltration and even light machining prior to matrix infiltration without loss of the near final shape.

It is an object of the present invention to satisfy this need.

SUMMARY OF THE INVENTION

The invention envisions a method of making a preform by impregnating a preform made of reinforcement strands with a resin solution, curing the resin of the impregnated preform in such a manner as to impart a selected shape thereto and heating the shaped preform at a temperature effective to convert the cured resin to inorganic solids that are so dispersed between the strands in sufficient quantity as to rigidize the preform to permit subsequent handling, optional light machining and matrix infiltration with an inorganic matrix material without substantial loss of the selected shape. Preferably, the inorganic solids comprise at least about 6% by weight of the heat treated preform to effect rigidization thereof. A reinforced composite article is formed in accordance with the invention by infiltrating the rigidized preform with the inorganic matrix material. The rigidizing inorganic solids are selected to be chemically and physically compatible with the matrix material under the intended service conditions of the composite article.

In a preferred embodiment of the invention, the filamentary preform is impregnated with a silicone resin solution, heated at a first temperature under pressure to cure (pre-rigidize) the resin and heated at a second higher temperature effective to convert the cured silicone resin to silica solids that are so dispersed between the strands in an amount of at least about 6% by weight as to finally rigidize the preform. The rigidized preform is then infiltrated with the inorganic matrix material, preferably a ceramic material, to form the composite article. The silica solids bridge and fill between portions of adjacent strands at dispersed locations throughout the preform to rigidize the preform; however, the silica solids preferably do not physically bond to the strands when a ceramic matrix is employed to form the reinforced composite article.

The present invention also envisions preforms comprising a plurality of reinforcement strands rigidized in a selected shape by a sufficient quantity of inorganic solids, preferably silica solids, dispersed between the strands.

The present invention further envisions composite articles comprising a matrix material, reinforcement strands dispersed in the matrix material and inorganic solids, preferably silica solids, dispersed between the strands.

DESCRIPTION OF PREFERRED EMBODIMENTS

Figure 1:
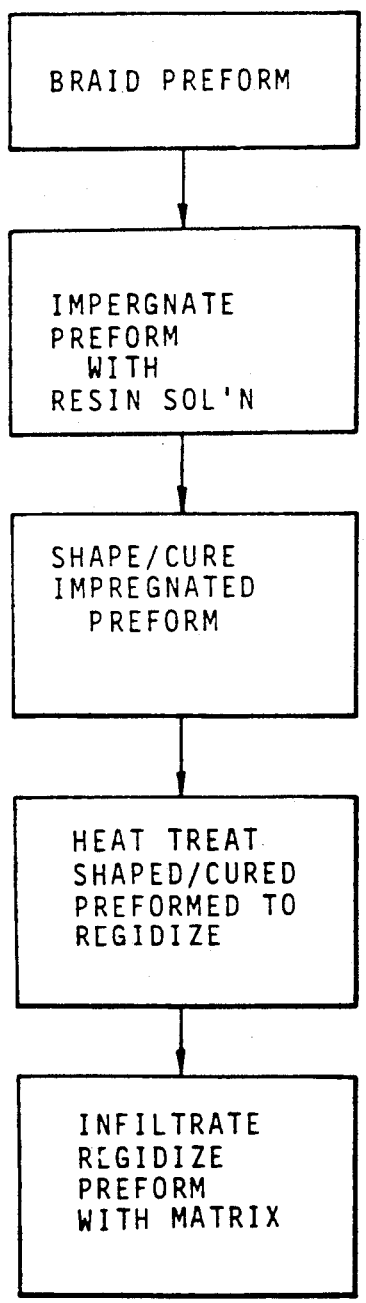
FIG. 1 is a flow chart illustrating the method of the invention.

FIG. 1 illustrates a preferred method of the invention in the form of a process flow diagram.

The method involves initially braiding suitable reinforcement strands to form a three-dimensional preform preferably resembling the shape of the final composite article to be produced. The preform can be braided on known braiding machines such as those shown in U.S. Pat. Nos. 3,926,804 and 4,312,761. Preferably, for production applications, the preform is formed on a braiding machine of the type described in copending application Ser. No. 191,434 now U.S. Pat. No. 4,922,798 and 191,546 now U.S. Pat. No. 4,984,504, of common assignee herewith, the teachings of which are incorporated herein by reference. Although a 3D braided preform formation step is shown in FIG. 1, those skilled in the art will appreciate that other known techniques for forming the preform can be used. For example, weaving, filament winding, tape wrapping as well as other techniques can be used to produce a two-dimensional or three-dimensional preform.

Figure 2:
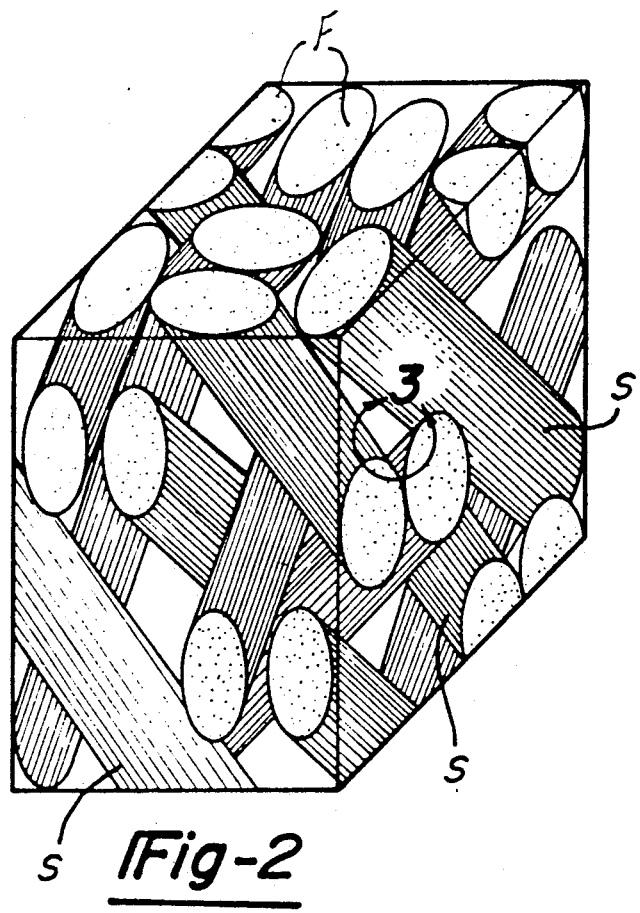
FIG. 2 is a partial perspective view of a preform comprising 3-D braided strands with each strand constituting a bundle of multiple filaments.
Figure 3:
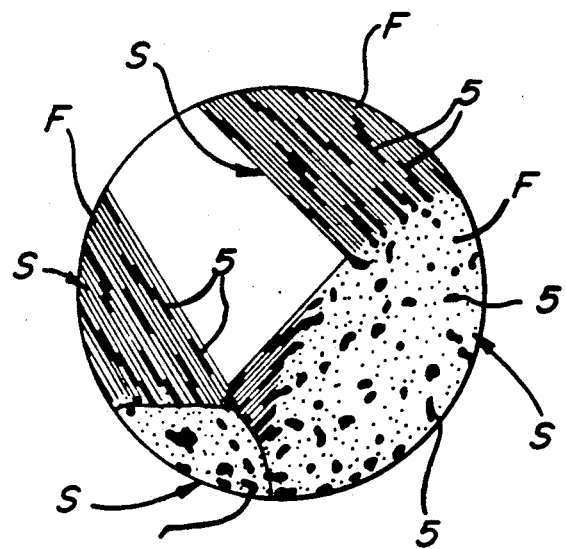
FIG. 3 is an enlarged view of the encircled portion of FIG. 2 showing the silica solids dispersed between the strands and between filaments of individual strands of the preform.

Suitable reinforcement strands for use in making the preform include continuous monofilaments or multi-filament bundles (yarns). Reinforcement strands S comprising bundles of multiple filaments F are shown in FIGS. 2-3. The dimensions and mechanical properties (e.g., tensile strength) of the reinforcement strands will vary depending upon the matrix material employed in the composite article, the intended service application of the composite article and other factors, such as cost and availability.

Typically monofilament strands will have a diameter in the range from about 1 to 150 μm. usually in the range from about 5 to 10 μm. Yarns will be comprised of a plurality of individual monofilaments. typically from about 100 to 20,000 filaments, usually from about 3000 to 6000 filaments, with each filament having a diameter in the range from about 1 to 20 μm. The denier of both the monofilaments and the yarns used as reinforcement strands will typically be in the range from about 500 to 5000 mg/m, usually in the range from about 1000 to 2000 mg/m. Denier is equal to the number of grams which yields 9000 meters of the yarn or filament.

Suitable reinforcement strands may be composed of a wide variety of materials, usually although not necessarily being inorganic filaments. Suitable materials include glass filaments and yarns, such as fused silica, "C" glass, "D" glass, "E" glass, "M" glass and "S" glass available from a wide variety of commercial suppliers, including Owens-Corning Fiberglass Corp., Toledo, Ohio, and PPG Industries. Pittsburg, Pa. Suitable ceramic fibers include silicon carbide, alumina, boron/-tungsten, boron carbide, boron nitride, and zirconia filaments and yarns available from commercial suppliers such as Dow Corning Corporation, Midland, Mich.; AVCO, Specialty Materials Division, Lowell, Mass.; and the 3 M Company, Minneapolis, Minn.; and carbon or graphite filaments and yarns available from Hercules, Inc., Wilmington, Del., Celanese Engineering, Chatham, N.J., Amoco Performance Products, Specialty Polymers and Composites Division, Danbury, Conn., and Hitco, Gardena, Calif. Aramid filaments and yarns, available commercially from suppliers such as DuPont de Nemours, Wilmington, Del., under the trade name Kevlar are also suitable.

The preforms will usually be composed of a single type of reinforcement strand, although in some cases it may be desirable to employ two of more different reinforcement strand materials. Similarly, the multi-filament reinforcement strand (or yarn) may be composed of two or more filament materials when it is desired to combine the characteristics of the various materials.

Once the preform is braided or otherwise formed, it is impregnated with a solution of catalized silicone resin (e.g., 2106 resin available from Dow Corning Corporation, Midland, Mich.). The silicone resin is typically supplied as 60% by weight solids solution from the manufacturer. Preferably, the solution is further diluted with toluene as the diluting solvent to provide a desired solids content for the particular reinforcement strand used so as to provide a rigidizing effect upon subsequent thermal conversion of the cured resin as will be described hereinbelow. The percentage of solids of the solution should be determined based on the density of the strand material. The following relationships (empirical formulae) were found empirically to express the desired silicone resin solids content of the resin solution (e.g., formula I) and corresponding or resulting silica solids content of the heat treated preform (e.g., formula II):

$$\% \text{ solids of silicone resin solution} = \qquad \qquad \text{I}$$
$$(0.671 \div \text{density of strand material}) \times 100, \text{ yields}$$

$$\% \text{ solids (after thermal conversion) of silica} = \qquad \text{II}$$
$$(0.305 \div \text{density of strand material}) \times 100$$

This relationship was determined empirically using a Nextel 440 ceramic fiber (density=3.05 gm/cc) 3D preform and a Nicalon silicon carbide fiber (density=2.55 gm/cc) 3D preforms. For example, percent solids in the resin solution was varied until an effective amount of residual silica solids in the heat treated preform was obtained which yielded a rigidized preform with dimensions that remained unchanged after the curing operation and the thermal conversion (heat treat) operation shown in FIG. 1. As the examples set forth hereinbelow will indicate, preferably the solids content of the resin solution is selected to provide at least about 6% by weight (also w/o) of residual inorganic solids (i.e., silica solids) in the preform after the thermal conversion (heat treat) step. Nextel 440 ceramic fibers are available from 3M Company—Ceramic Materials Division. Nicalon silicon carbide fibers are available from Dow Corning Corporation.

Prior to impregnation of the preform with the resin solution, the dry 3D braided preform may be subjected to a preliminary heat treatment of 1000° F. in air until a constant weight over time is obtained to remove any residual organic sizing that may be present on the reinforcement strands.

The 3D braided preform is typically saturated with the resin solution (e.g., resin solution weight = 1.5×the dry preform weight). Thereafter, excess resin solution is bled-out of the preform using a bleeder cloth or other absorbent material.

The impregnated preform is then placed in a shaping fixture (i.e., a shaping mold) having a mold cavity of a shape to impart a selected near final article shape to the preform. The surfaces of the shaping mold are treated with a release agent (e.g., FREEKOTE 44 available from Dexter Corp., Hysol Aerospace and Industrial Products Division, Seabrook, N.H.). The mold with the impregnated preform is placed in a vacuum chamber and a vacuum of about minus 25 mm of Hg is applied on the impregnated preform in the shaping mold for a suitable time (e.g., about 20 minutes for a preform of 5-15 grams in weight) to remove some of the solvent.

The mold with the impregnated preform therein is then transferred from the vacuum chamber to a heated press (press temperature of 300° F.) and a sufficient pressure is applied for a suitable time (e.g., one hour) to cure and pre-rigidize the silicone resin. Typically, only a slight pressure is applied to the mold; e.g., to effect closure of the mold halves together or partial closure as permitted by mold closure control stops (e.g., 100 psi or less). The mold may include the mold closure stops to limit the degree of pressure applied to the preform. Curing of the resin in the mold is conducted so as to impart the selected near final shape and fiber volume fraction to the preform. The cured preform having the selected shape is removed from the mold and the heated press and the cured preform are allowed to cool to ambient temperature in air.

Referring to FIG. 1, the cured, pre-rigidized, shaped preform is then heat treated in air at an elevated temperature effective (e.g., about 1000° F. for cured silicone resin) to thermally convert the cured resin to inorganic solids (e.g., silica solids for cured silicone resin) in a sufficient quantity (e.g., at least about 6% by weight) throughout the preform between the strands to finally rigidize the preform. The preform is heat treated until a constant weight is observed over time. The silica (or other inorganic) solids 5 fill or bridge between the reinforcement strands S and between the individual filaments F at dispersed locations throughout the preform;

e.g., as illustrated in FIG. 3. Preferably, when a ceramic matrix is to be used in the composite article, the silica (or other inorganic) solids do not bond, chemically or physically, with the reinforcement strands but instead bridge or fill between the strands at the dispersed locations to provide a sufficient rigidizing effect on the preform to permit subsequent handling, optional light machining and matrix infiltration without loss of the near final shape imparted to the preform in the preceding shaping/curing operation. After thermo-conversion of the cured resin to the inorganic solids, the dimensions and shape of the preform should be substantially the same as those provided by the preceding shaping/curing operation.

After the preform has been finally rigidized (i.e., by thermo-conversion of the cured resin to inorganic solids), it can be infiltrated with an inorganic matrix material, preferably a ceramic, to form the desired composite article. The ceramic matrix material may be selected from, for example, silicon carbide, silicon nitride, various known glasses, fused silica, zirconia, and like ceramic matrix materials. The inorganic solids (e.g., silica solids) used for rigidizing purposes are selected to be compatible in a chemical and physical sense with the matrix material to avoid adverse chemical interactions and the like under the intended service conditions of the article. Preferably, the ceramic matrix material is infiltrated into the rigidized preform using conventional gaseous infiltration techniques such as chemical vapor infiltration or chemical vapor deposition, although other infiltration or impregnation techniques might be used.

The following examples are offered to illustrate the invention in greater detail:

EXAMPLES TO ILLUSTRATE THE INVENTION

Preform specimens of rectangular block shape in a variety of sizes were used for the rigidization trials following the procedure described below. Success of the trials was based on dimensional stability of the preform after high temperature heat treatment (i.e., after thermo-conversion) as well as the ability of the preform to undergo some machining without marked distortion. It should be noted that the dimensions of the preform for Example #1 ((11 w/o solids) are less accurate due to the preform's compressibility.

The amount of solids in the resin solution was varied until a sufficient amount of residual silica solids resulted in providing a rigidized preform. Percent solids solution for different types of strand or fiber material was calculated based on the empirical formulae set forth hereinabove. The formulae take into account the density of the strand material.

Certain trends in the degree of rigidization of the preforms versus weight percent solids in the heat treated preform were evident from the trials. In particular, heat treated preforms with residual silica solids above approximately 6.3% by weight displayed the desired dimensional stability and machineability. Those heat treated preforms with less than a 3.7 w/o (% by weight) silica solids were shown to have a change in dimensions after high temperature heat treatment (thermo-conversion) as high as 18.5% with poor machinability.

As an initial starting point for the trials, a 5 w/o (% by weight) silica solids content remaining in the preform after heat treatment (thermo-conversion) was used and a silicone solids solution (i.e., 11 w/o silicone solids solution) was prepared which theoretically would yield 5 w/o (% by weight) solids in the preform upon heat treatment.

As will become apparent from Tables I and II set forth hereinbelow, this solids solution provided an insufficient amount of residual silica solids in the heat treated preforms to impart enough rigidity to stabilize the dimensions and improve preform integrity. As a result, a number of other silicone solids solutions with different solids content were then tried. A 22% by weight solids solution resulted in at least about 6 % by weight silica solids in the heat treated preforms and a successful trial.

The preforms were prepared in accordance with the following procedure.

EXAMPLE #1

Procedure:

A preweighed 3-D braided Nextel 440 preform (previously heat treated to 1000° F. to a constant weight) was impregnated at ambient temperature with a diluted 2106 Dow silicone resin/catalyst solution (1.5×preform weight) in a 2" wide mold. Solutions of 11 w/o and 22 w/o silicone solids were used. The mold with the preform therein was placed in a −25 mm Hg vacuum chamber at room temperature for 20 minutes. The mold with the preform therein was then placed in a press preheated to 300° F. for 1 hour with sufficient platen pressure to close the mold (i.e., 100 PSI or less) to cure the resin. Weight and dimensions were noted. The composite was then heat treated at 1000° F. in air until constant weight was observed. Results of two of the trials for these solids solutions (i.e., 11 w/o and 22 w/o solids solutions) are set forth in Tables I and II where percent weight increase (% WT. INCR.) was determined relative to the initial dry preform to indicate the amount of resin solution or amount of silica solids present after impregnation/curing or heat treat (thermo-conversion), respectively.

TABLE I

| 11% Silicone Solids - Nextel 440 Preforms | | | | | |
|---|---|---|---|---|---|
| | WEIGHT | THICKNESS* | WIDTH* | MACHINABILITY | % WT. INCR. |
| Specimen #1 S/N 341-4 - Initial Weight = 10.57 g | | | | | |
| Cured Resin Specimen | 11.61 g | 0.158" | 1.82" | Good | 9.84% |
| Heat-Treated Rigidized Specimen | 10.96 g | 0.187" | 1.94" | Poor | 3.67% |
| Specimen #2 S/N 341-5 - Initial Weight = 10.47 g | | | | | |
| Cured Resin Specimen | 11.42 g | 0.157" | 1.88" | Good | 9.10% |
| Heat-Treated | 10.81 g | 0.182" | 1.96" | Poor | 3.25% |

TABLE I-continued

| 11% Silicone Solids - Nextel 440 Preforms | | | | |
|---|---|---|---|---|
| WEIGHT | THICKNESS* | WIDTH* | MACHINABILITY | % WT. INCR. |

Rigidized Specimen

*NOTE: Preform dimensions were difficult to obtain after heat treatment due to the amount of compressability which remained in the preform.

TABLE II

| | 22% Silicone Solids Soln - Nextel 440 Preform | | | | |
|---|---|---|---|---|---|
| | WEIGHT | THICKNESS | WIDTH | MACHINABILITY | % WT. INCR. |
| | Specimen #1 S/N 433-3 - Initial Weight = 12.88 g | | | | |
| Cured Resin Specimen | 14.15 g | 0.210" | 1.87" | Good | 9.86% |
| Heat-Treated Rigidized Specimen | 13.69 g | 0.203" | 1.83" | Good | 6.30% |
| | Specimen #2 S/N 433-2 - Initial Weight = 12.82 g | | | | |
| Cured Resin Specimen | 14.11 g | 0.230" | 1.87" | Good | 10.10% |
| Heat-Treated Rigidized Specimen | 13.65 g | 0.225" | 1.80" | Good | 6.47% |

EXAMPLE #2

Trials were also run using the same procedure as example #1 but with 3D braided Nicalon silicon carbide (density =2.55 g/c.c.) preforms. A 26% by weight 2106 Dow silicone resin solids solution was used based on the aforementioned empirical formulae. Generally, this 26 w/o solids solution yielded about 12 w/o silica solids in the heat treated preforms. Results from these trials with the Nicalon silicon carbide fibers are set forth in Table III.

TABLE III

| | 26% Silicone Solids Soln - Nicalon Silicon Carbide Preform | | | | |
|---|---|---|---|---|---|
| | WEIGHT | THICKNESS | WIDTH | MACHINABILITY | % WT. INCR. |
| | Specimen #1 S/N 421-1 - Initial Weight = 5.61 g | | | | |
| Cured Resin Specimen | 5.91 g | 0.190" | 0.504" | Good | 14.53% |
| Heat-Treated Rigidized Specimen | 5.55 g | 0.180" | 0.490" | Good | 7.56% |
| | Specimen #2 S/N 421-2 - Initial Weight = 4.03 g | | | | |
| Cured Resin Specimen | 4.57 g | 0.187" | 0.506" | Good | 13.40% |
| Heat-Treated Rigidized Specimen | 4.30 g | 0.181" | 0.500" | Good | 6.70% |

It is apparent from Tables I-III that the 22 w/o and 26 w/o silicone solids solutions were successful in achieving the objects of the present invention.

While the invention has been particularly described with reference to preferred embodiments thereof, it will be understood by those skilled in the art that various changes in form and detail may be made therein without departing from the spirit and scope of the invention as defined in the following claims.

We claim:

1. A method of making a preform, comprising:
    (a) forming a preform of reinforcement strands,
    (b) impregnating the preform with a silicone resin solution comprising silicone solids thermally convertable to silica solids,
    (c) curing the resin of the impregnated preform under conditions that a selected shape is imparted to said preform, and
    (d) heating the shaped preform at a temperature effective to convert the cured silicone resin to silica solids in sufficient quantity to rigidize the shaped preform to allow subsequent handling and infiltration of the shaped preform with an inorganic matrix material.

2. The method of claim 1 wherein in step (a), the reinforcement strands are braided to form a three-dimensional preform.

3. The method of claim 1 wherein in step (c), the impregnated preform is subjected to pressure during heating to cure the resin.

4. The method of claim 1 wherein in step (d), the silica solids fill between the reinforcement strands without substantially bonding with said reinforcement strands.

5. The method of claim 1 including impregnating the preform in step (b) with a resin solution whose solids content is sufficient to yield at least about 6% by weight of inorganic solids in heat treated preform after step (d).

6. A method of making a reinforced composite article, comprising:
    (a) forming a preform of reinforcement strands,
    (b) impregnating the preform with a silicone resin solution comprising silicone solids thermally convertable to silica solids,
    (c) curing the resin of the impregnated preform under conditions that a selected shape is imparted to said preform,
    (d) heating the shaped preform at a temperature effective to convert the cured resin to silica solids in sufficient quantity to rigidize the shaped preform, and (e) infiltrating the rigidized preform with an inorganic matrix material to form the filamentary reinforced article.

7. The method of claim 6 wherein in step (a), the reinforcement strands are braided to form three-dimensional preform.

8. The method of claim 6 wherein the inorganic matrix material comprises a ceramic material.

* * * * *